(12) United States Patent
Wienand et al.

(10) Patent No.: US 11,268,864 B2
(45) Date of Patent: Mar. 8, 2022

(54) SENSOR UNIT FOR DETECTING A SPATIAL TEMPERATURE PROFILE AND METHOD FOR PRODUCING A SENSOR UNIT

(71) Applicant: Heraeus Nexensos GmbH, Hanau (DE)

(72) Inventors: Karlheinz Wienand, Aschaffenburg (DE); Stefan Dietmann, Alzenau (DE); Kai-Ulrich Boldt, Hanau (DE); Dieter Teusch, Bruchkoebel (DE); Martin Bleifuss, Kahl (DE); Uwe Hellmann, Freigericht (DE); Matthias Muziol, Mainhausen (DE)

(73) Assignee: Heraeus Nexensos GmbH, Hanau (DE)

(*) Notice: Subject to any disclaimer, the term of this patent is extended or adjusted under 35 U.S.C. 154(b) by 160 days.

(21) Appl. No.: 16/633,847

(22) PCT Filed: Mar. 20, 2018

(86) PCT No.: PCT/EP2018/056961
§ 371 (c)(1),
(2) Date: Jan. 24, 2020

(87) PCT Pub. No.: WO2019/020220
PCT Pub. Date: Jan. 31, 2019

(65) Prior Publication Data
US 2020/0240848 A1    Jul. 30, 2020

(30) Foreign Application Priority Data
Jul. 25, 2017  (EP) .................................. 17182978

(51) Int. Cl.
*G01K 3/14*   (2006.01)
*G01K 1/14*   (2021.01)
(Continued)

(52) U.S. Cl.
CPC ............... *G01K 3/14* (2013.01); *G01K 1/026* (2013.01); *G01K 1/14* (2013.01); *H01M 10/486* (2013.01); *H01M 50/569* (2021.01)

(58) Field of Classification Search
CPC ............ G01K 3/14; G01K 1/026; G01K 1/14; H01M 10/486; H01M 50/569
See application file for complete search history.

(56) References Cited

U.S. PATENT DOCUMENTS 6,152,597 A * 11/2000 Potega ............. H01M 10/4257
                                                            374/185
7,059,769 B1 * 6/2006 Potega ................... B60L 58/12
                                                            374/185
(Continued)

FOREIGN PATENT DOCUMENTS

CN      1490619     4/2004
CN      1739286     2/2006
(Continued)

*Primary Examiner* — Nathaniel T Woodward
*Assistant Examiner* — Philip L Cotey
(74) *Attorney, Agent, or Firm* — Dicke, Billig & Czaja, PLLC (57) ABSTRACT

A sensor unit for detecting a spatial temperature profile, having at least one substrate with a first surface and a second surface situated at least regionally opposite the first surface. The substrate is configured at least regionally to be flexible. At least one adhesion means is arranged at least regionally on the first surface and/or on the second surface for attaching the sensor unit to at least one measurement body. At least one sensor field is arranged on the second surface of the substrate. One aspect also relates to a method for producing a sensor unit.

14 Claims, 4 Drawing Sheets

(51) Int. Cl.
*H01M 10/48* (2006.01)
*G01K 1/02* (2021.01)
*H01M 50/569* (2021.01)

(56) References Cited

U.S. PATENT DOCUMENTS

| | | | |
|---|---|---|---|
| 7,161,154 | B2 | 1/2007 | Nascetti et al. |
| 7,323,098 | B2 | 1/2008 | Miyashita et al. |
| 9,029,180 | B2 | 5/2015 | Britton et al. |
| 9,316,546 | B2 | 4/2016 | Tsubaki et al. |
| 9,454,112 | B1 | 9/2016 | Gotoh et al. |
| 9,664,573 | B2 | 5/2017 | Britton et al. |
| 9,671,915 | B2 | 6/2017 | Shepelev |
| 9,939,972 | B2 | 4/2018 | Shepelev et al. |
| 2005/0081398 | A1* | 4/2005 | Sun ............... G01D 11/30 33/645 |
| 2007/0292957 | A1* | 12/2007 | Chua ............. G01N 15/0826 436/5 |
| 2011/0039137 | A1* | 2/2011 | Engle ............. H01M 10/486 429/90 |
| 2013/0004811 | A1 | 1/2013 | Banerjee et al. |
| 2013/0196196 | A1* | 8/2013 | Obeidi ........... H01M 10/486 429/82 |
| 2013/0209846 | A1 | 8/2013 | Lev et al. |
| 2013/0230755 | A1 | 9/2013 | Dimmock |
| 2013/0288091 | A1* | 10/2013 | Tsubaki ............. G01K 7/22 429/90 |
| 2015/0007665 | A1 | 1/2015 | Britton et al. |
| 2015/0035680 | A1* | 2/2015 | Li .................. G01K 1/14 340/584 |
| 2015/0036722 | A1 | 2/2015 | Yu |

FOREIGN PATENT DOCUMENTS

| | | |
|---|---|---|
| CN | 1796951 | 7/2006 |
| CN | 101 082 523 | 12/2007 |
| CN | 102419217 | 4/2012 |
| CN | 203 070 853 | 7/2013 |
| CN | 103 282 754 | 9/2013 |
| CN | 104 185 780 | 12/2014 |
| CN | 106055181 | 10/2016 |
| CN | 205826179 | 12/2016 |
| CN | 106325591 | 1/2017 |
| DE | 10 2010 046 992 | 9/2011 |
| DE | 10 2011 103 828 | 12/2012 |
| DE | 10 2013 016 280 | 4/2015 |
| DE | 11 2011 104 686 | 9/2017 |
| JP | H0510826 | 1/1993 |
| JP | 2015512044 | 4/2015 |
| JP | 2017058268 | 3/2017 |
| KR | 20090132101 | 12/2009 |
| KR | 2013-0099301 | 9/2013 |
| WO | 2012035494 | 3/2012 |
| WO | 2012/093572 | 6/2014 |

\* cited by examiner

SENSOR UNIT FOR DETECTING A SPATIAL TEMPERATURE PROFILE AND METHOD FOR PRODUCING A SENSOR UNIT

CROSS REFERENCE TO RELATED APPLICATION

This Utility Patent Application claims priority under 35 U.S.C. § 371 to International Application Serial No. PCT/EP2018/056961, filed Mar. 20, 2018, which claims the benefit of European Patent Application No. EP 17182978.1, filed Jul. 25, 2017; which are both incorporated herein by reference.

The present invention relates to a sensor unit for detecting a spatial temperature profile. The present invention further relates to a method for producing a sensor unit.

In the prior art, common sensor units are used for temperature measurement at individual galvanic cells or at galvanic cells of a cell stack such as, for example, at fuel cells or cells of an energy storage device, for example of a battery, for monitoring a cell temperature. Rapid temperature increases can influence the chemical processes in a cell to the extent that initially the efficiency of the cell decreases. With long-lasting overheating of the cell, damage can occur in the cell, which may lead to complete destruction of the cell. Depending on the respective application of the cells in a cell stack, several sensor elements may be arranged on a cell and/or on several cells of the cell stack for temperature monitoring.

To this end, US 2013/0230755 A1 describes, for example, a flexible line, which may be arranged between the cells of a cell stack and at the end of which a temperature sensor can be connected.

A further temperature sensor unit for detecting a cell temperature is described in US 2013/0004811 A1. The temperature sensor unit comprises a flexible substrate with a resistance thermometer arranged thereupon with connections, which can be connected to the housing of a battery cell.

However, the temperature sensor units known from the prior art have a very complex and space-consuming construction. Furthermore, the known temperature sensor units usually only enable the recording of one temperature value at one position of a cell/a cell stack. In addition, the known temperature sensor units may often be very difficult to position on the cell/cell stack.

Thus, the object of the present invention is to provide an improved temperature sensor unit and a method for producing an improved temperature sensor unit.

According to the invention, this object is achieved by means of a temperature sensor unit according to the subject matter of claim 1.

To this end, the sensor unit according to the invention for detecting a spatial temperature profile has the following:
at least one substrate with a first surface and a second surface situated at least regionally opposite the first surface, wherein the substrate is configured at least regionally to be flexible;
at least one adhesion means, wherein the adhesion means is arranged at least regionally on the first surface and/or on the second surface for attaching the sensor unit to at least one measurement body; and
at least one sensor field, wherein the sensor field is arranged on the second surface of the substrate.

The term "spatial temperature profile" in this context can be used to characterize a recording of at least two temperature values at at least two positions along one or more measurement bodies. The recording of the temperature values may take place simultaneously or successively. The term "different positions" may be replaced with terms such as, for example, "different regions" or "different points."

A substrate that can change its form substantially without destruction under the effect of force, at least in certain regions, can be used as a substrate that is flexibly designed at least in regions. Depending on the embodiment, the substrate may return to the original form or remain in the changed form upon the cessation of the applied force. Furthermore, depending on the embodiment used, all regions of the substrate may be flexibly designed, or only certain regions, in order to thereby be adapted to the geometry of the measurement body.

In general, the sensor unit according to the invention for temperature measurement can be arranged on a plurality of different measurement bodies. Depending on the application, the measurement body may be a battery cell, a fuel cell, or even a different heat-generating body such as, for example, a motor, a heating element in a sensor, or a heating mechanism such as, for example, a heating mechanism in an electronic cigarette, or an aerosol evaporator.

For simplified attachment of the sensor unit to at least one measurement body, an adhesion means is arranged, at least regionally, on the first surface and/or on the second surface of the substrate according to the invention.

The adhesion means may be any means that causes mechanical bonding of the substrate and the measurement body. For example, an adhesive film can be used as the adhesion means. Alternatively or additionally, an adhesive may also be used which is initially applied in the liquid state to the first and/or second surface of the substrate and is then connected to the measurement body.

In order to measure the temperature profile, the sensor unit has a sensor field, which is arranged on the second surface of the substrate. The sensor field may comprise sensor elements, electrical lines, and optionally insulation layers. The sensor elements may be arranged at different positions on the measurement body independently of one another. Alternatively or additionally, the sensor field may also comprise a sensor element with a contiguous structure, which is adapted to determine at least two temperature values at at least two positions along one or more measurement bodies.

The sensor unit may further have a second sensor field, which may comprise sensor elements, electrical lines, and optionally insulation layers and which is arranged on the first surface of the substrate.

Further advantageously, the use of a sensor unit according to the invention provides a cost advantage as compared to the use of individual sensor units, because individual sensor units must be individually positioned and connected.

The invention makes it possible for the first time to provide a sensor unit that is integrated easily and in a space-saving manner and that also makes it possible to record temperature values at various positions on a complex measurement body in parallel.

In one example, the sensor field comprises at least two sensor elements, each of which is adapted for recording a temperature, and which are arranged at different positions on the second surface of the substrate.

The two sensor elements may be at least partially connected to one another; for example, the sensor elements may have a common ground connection. Alternatively, the sensor elements may have contact established separately from one another. In addition, the sensor field may have more than two sensor elements depending on the planned area of use.

Advantageously, temperature values can be recorded at different positions of a measurement body through the use of several sensor elements in one sensor field.

In one example, at least one sensor element on the second surface has electrical contact by means of at least one trace on the second surface, and/or at least one sensor element on the second surface has electrical contact by means of at least one trace on the first surface, wherein at least one via point through the substrate electrically connects the sensor element on the second surface with the trace on the first surface.

The electrical contacting of the sensor elements may take place such that the respective traces for establishing contact with the sensor elements are arranged on the same side of the substrate on which the sensor elements are also arranged. Alternatively or in addition to this, traces may also be arranged on the opposite first surface of the substrate and establish electrical contact with the contacts of the sensor elements on the second surface by means of via points. The term "via point" in this context can be understood as a conductive area, which extends through the material of the otherwise not conductive substrate, from the first surface of the substrate to the second surface of the substrate, and establishes an electrical connection between a trace on the first surface with a trace on the second surface.

Advantageously, the sensor elements may be arranged on the substrate in a space-saving manner due to an at least partial arrangement of the traces on the first surface of the substrate. The resulting sensor unit can be designed compactly due to such an arrangement.

In a further example, the sensor elements are at least regionally formed from a common central trace, which is arranged on the first surface and/or on the second surface.

For example, the ground contact may be formed as a common trace in order to hereby achieve a compact and material-saving construction.

In yet another example, the sensor elements comprise resistance elements, particularly meandering resistance lines made from a conductive material, particularly platinum.

Advantageously, very thin sensor elements, which contribute to a compact and material-saving construction, can be formed due to an arrangement of meandering resistance lines on the substrate.

In one example, the resistance elements are arranged on the second surface using screen-printing or vapor deposition.

Especially advantageously, even small quantities of correspondingly produced sensor units can be produced economically without complex retrofitting costs of the production means due to direct printing of the resistance elements onto the substrate. When the resistance elements are intended to be screen-printed, the entire design process of the sensor unit can also take place digitally, whereby the times from the design to a prototype can be reduced significantly.

In a further example, the sensor elements comprise flip chips. Temperature sensors that are designed as flip chips are described, for example, in DE102011103828A1. Flip chips form a bridge between the traces, which is attached to contact fields, and enable simple populating of a sensor field with temperature sensors, for example.

The traces of a sensor field may comprise conductive materials, for example metals, conductive metal oxides, fully conductive particles, filled polymers, or intrinsically conductive polymers.

In one example, at least two traces intersect at least regionally, wherein at least one insulation layer is arranged between the two traces in a region in which the two traces intersect.

The insulation layer may comprise, for example, electrically insulating materials, for example insulating metal oxides or polymers, particularly polyimide, in order to prevent short-circuits.

In yet a further example, the traces have at least one connection means, particularly at least one connection pad, comprising a silver and/or copper material for establishing contact with the sensor elements.

Advantageously, a connection means, for example a copper wire, can be soldered to the connection pads in order to connect the sensor unit to an evaluation means, for example to a controller.

In a further example, the substrate comprises a flexible film, particularly a polyimide film.

Advantageously, a flexible film damps vibrations of the electronic construction and prevents cracks in the metallic supply lines and connection breaks at the contact points. Further advantageously, the sensor unit is deformable due to the flexible film and thus can be adapted to the surface of the sensor unit.

In one example, the adhesion means comprises at least one adhesive film.

Advantageously, the sensor unit can be easily and economically attached to a surface of the measurement body by means of the adhesive film. The adhesive film may extend over the entire first and/or second surface or extend only over a partial area of the first and/or second surface.

In a further example, temperature sensors, which are formed as flip chips, are attached to the second surface of the substrate. The sides of the flip chip facing away from the substrate are directly connected to the measurement body via an adhesion film.

The adhesive film may have a self-adhesive material, for example polymers, such as polyacrylates, polyamides, polyurethanes, silicones, or epoxides. Adhering adhesive films, particularly high-temperature-resistant adhesive films based on polyamide belts, may also be used on both sides to attach the sensor unit to the measurement body.

In yet another example, the sensor unit has the following: at least one leveling film formed as a single part or multiple parts, particularly a leveling film comprising a polymer, a circuit-board material, particularly a phenolic laminated sheet or a glass-fiber-reinforced epoxide, arranged on the second surface of the substrate at least regionally.

The thickness of the leveling film may correspond at least to the height of the sensor elements attached to the substrate and optionally equipped with an adhesion layer. The thickness of the leveling film is preferably 0.1 mm-1 mm. Furthermore, the leveling film may comprise recesses in order to enclose the sensor elements at least partially. The leveling film may be designed as a single part or multiple parts.

For example, the leveling film may be positioned on the substrate such that the recesses enclose the sensor elements at least partially. The leveling film may be connected to the substrate by means of bonding or hot pressing. The multi-part design of the leveling film has the advantage that the flexibility of the sensor unit is retained.

The placement of a leveling film on a sensor unit advantageously makes handling of the sensor units easier. Thus, the sensor elements are protected from mechanical damage, for example, during the connecting of the sensor unit to a measurement body, particularly during the insertion of the sensor unit into narrow slots of a measurement body. A further advantage of this design is that the sensor unit will not get caught on the measurement body during insertion.

Furthermore, the sensor unit may have the following in the aforementioned example:
at least one cover film arranged on the second surface of the substrate at least regionally in recess areas of the leveling film, particularly arranged on the sensor field, and/or at least one casting material, particularly a silicone compound, arranged on the second surface of the substrate at least regionally in recess areas of the leveling film, particularly arranged on the sensor field.

The cover film may also be designed as a single part or multiple parts and can cover the leveling film and the sensor elements at least regionally. This advantageously prevents penetration of moisture into the contact area. The cover film may also be designed as an adhesion film. Alternatively or additionally, at least one sensor element may be covered with a casting material in at least one recess of the leveling film, particularly with a silicone compound, in order to prevent the penetration of moisture. In this process, it is especially advantageous when the silicone compound has good thermal conductivity.

The invention also proposes a use of a sensor unit according to the invention to detect a spatial temperature profile at a measurement body, particularly at different cells of a battery or a fuel cell.

The invention also proposes a galvanic cell, particularly a battery cell or a fuel cell, having at least one sensor unit according to the invention arranged on the galvanic cell.

Furthermore, the invention proposes a method for producing a sensor unit for detecting a spatial temperature profile, having the following steps:
provision of at least one substrate with a first surface and a second surface situated at least regionally opposite the first surface, wherein the substrate is configured at least regionally to be flexible;
arranging at least one adhesion means, at least regionally, on the first and/or on the second surface of the substrate for attaching the sensor unit to at least one measurement body; and arranging at least one sensor field on the second surface of the substrate.

In one example, the arrangement has at least one sensor field:
arrangement of the sensor field by means of screen-printing, gravure printing, pad printing, and/or by means of inkjet printing on the basis of an ink comprising metallic particles made of gold, silver, platinum, and/or a silver-palladium alloy; and/or
arrangement of the sensor field by means of vapor deposition of a metallic layer onto the second surface and/or laser ablation of the metallic layer; and/or
arrangement of the sensor field by means of an aerosol deposition process through the deposition of aerosols comprising metals, particularly precious metals.

For example, for printing of the sensor field by means of inkjet, an inkjet ink based on metallic particles, particularly nanometallic particles, can be used. The production of gold nanoparticles is known, for example, from DE 10 2013 016 280 A1 and is especially suitable for producing conductive, oxidation-resistant structures.

Within a sensor field, the sensor elements comprising the sensor field may comprise electrical lines and insulation layers made of different materials. For example, the sensor elements may comprise precious metals, the electrical lines may comprise copper or silver, and the insulation layers may comprise polyimide.

In a further example, the arrangement has at least one sensor field:
arrangement of at least one trace, particularly a plurality of traces, for the electrical contacting of at least one of at least two sensor elements, which are comprised by the sensor field; and/or
arrangement of at least one connection means, particularly at least one connection pad, on the trace.

Further features and advantages of the invention result from the following description, in which preferred embodiments of the invention are explained by means of schematic drawings.

The following is shown.

Figure 1:
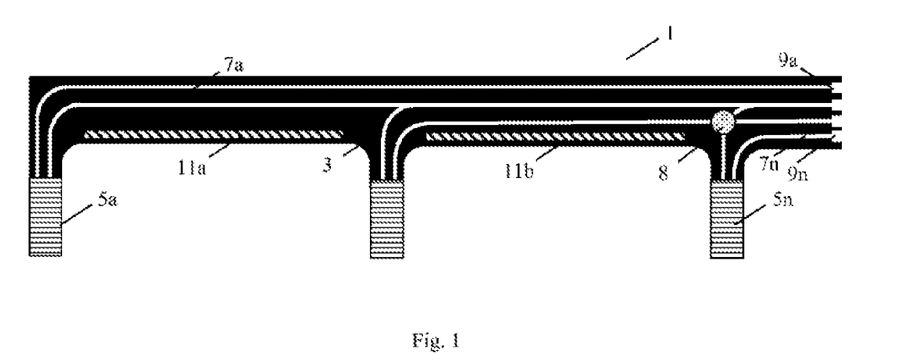
FIG. 1 a schematic view of a second surface of a sensor unit according to an embodiment of the invention.

FIG. 1 shows a schematic view of a second surface of a sensor unit 1 according to an embodiment of the invention.

In the embodiment shown, three sensor elements 5a-5n are arranged in a sensor field on the indicated second surface of the substrate 3 in order to determine three temperature values at different positions on a measurement body (not shown). In further embodiments, the sensor field may also comprise only two or more than three sensor elements. Depending on the intended area of application, the geometry of the substrate and the arrangement of the sensor elements on the substrate may also be selected differently than as shown in FIG. 1. For example, the substrate may also be designed as round or oval in further embodiments.

Furthermore, FIG. 1 shows that the sensor elements 5a-5n on the second surface have electrical contact by means of traces 7a-7n on the second surface. In the region of the intersecting traces, at least one insulation layer 8 is applied between the trace positioned underneath and above in order to prevent short-circuits. In the embodiment shown, the insulation layer 8 is designed substantially round and arranged substantially only in the region in which the traces intersect. In embodiments which are not shown, the insulation layer may also extend over further regions of the substrate; for example, the insulation layer may extend completely over traces of a first level in order to electrically insulate the traces of the first level from the intersecting traces of a second level arranged thereupon.

Connection pads 9a-9n are arranged at the ends of the traces 7a-7n for establishing contact with the sensor elements. A connection means, for example a copper wire, may be soldered onto the connection pads 9a-9n in order to connect the sensor unit 1 to an evaluation means (not shown). In further embodiments, the evaluation means may also be arranged directly on the substrate.

In FIG. 1, two adhesive films 11a, 11b are shown as the adhesion means. The two adhesive films are arranged on the second surface such that the sensor unit 1 with the second surface can be arranged on the measurement body. In further embodiments, the adhesion means may also be arranged on the first surface, which is opposite the second surface, alternatively or in addition to the shown embodiment. One skilled in the art would also know that only one single adhesive film or, however, more than two adhesive films may also be used as the adhesion means.

Figure 2:
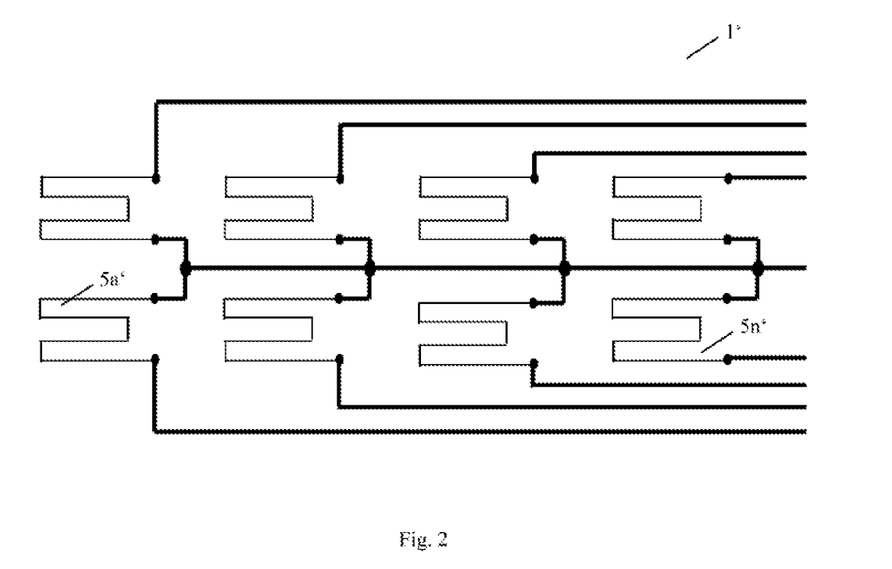
FIG. 2 a schematic wiring diagram of a sensor field according to an embodiment of the invention.

FIG. 2 shows a schematic wiring diagram of a sensor field according to an embodiment of the invention.

In the embodiment shown, the sensor elements 5a'-5n' comprise meandering resistance lines made of a conductive material. Platinum can be used, for example, for reliable measurements, because it exhibits particularly minimal aging and because temperature measurements with minimal error limits can thus be implemented.

The sensor elements 5a'-5n' each have a common ground connection and separate connections in order to determine the respective temperature values.

Advantageously, temperature values can be recorded at different positions of a measurement body through the use of several sensor elements in one sensor field.

Figure 3A:
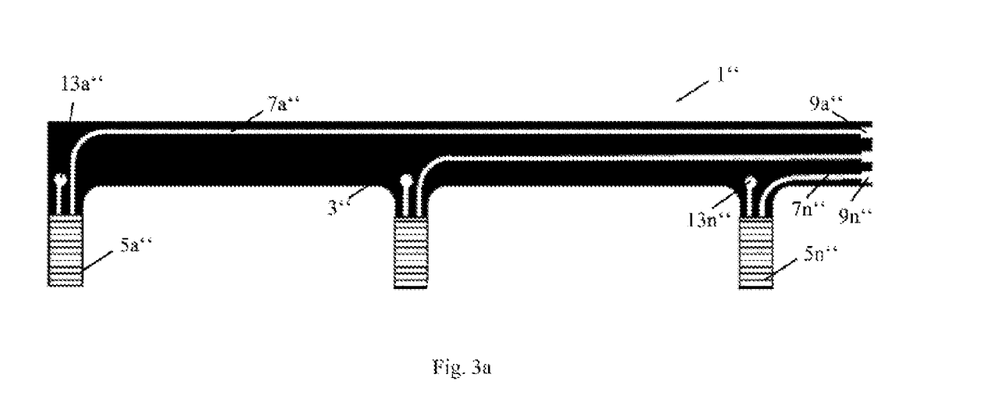
FIGS. 3a, 3b schematic views of a second and of a first surface of a sensor unit according to an embodiment of the invention.

FIG. 3a shows a schematic view of a second surface of a sensor unit 1" according to a further embodiment of the invention. The configuration of the sensor unit 1" shown in FIG. 3a may substantially correspond to the configuration of the sensor unit 1 shown in FIG. 1. However, in contrast to the sensor unit 1 shown in FIG. 1, the sensor unit 1" shown in FIG. 3a has via points 13a"-13n" through the substrate 3".

Figure 3B:
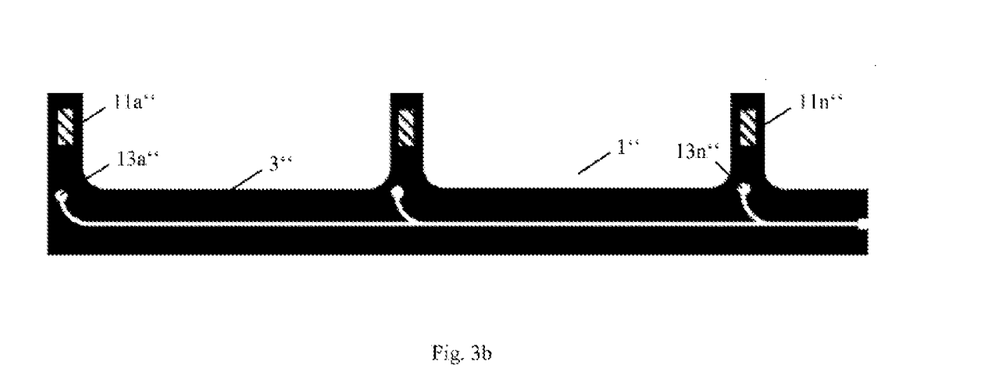

These via points 13a"-13n" enable electrical contacting of the sensor elements 5a"-5n" such that a portion of the respective traces for establishing contact with the sensor elements 5a"-5n" is arranged on the same side, i.e. on the second surface, of the substrate 3", just as sensor elements 5a"-5n" as well. Further traces are arranged on the opposite, first surface. FIG. 3b shows that the common ground connection is arranged on the first surface. In embodiments which are not shown, however, all or merely a portion of the sensor elements have contact with traces, which extend onto the first surface. The electrical connection between the sensor elements and traces may be established by means of via points accordingly.

In FIG. 3b, three adhesive films 11a"-11n" are also shown as the adhesion means. These adhesive films 11a"-11n" are arranged on the first surface such that the sensor unit 1" with the first surface can be arranged on a measurement body (not shown). In alternative embodiments, more or less than three adhesive films may also be used. For example, an adhesive film may be arranged fully on the first surface.

Figure 4:
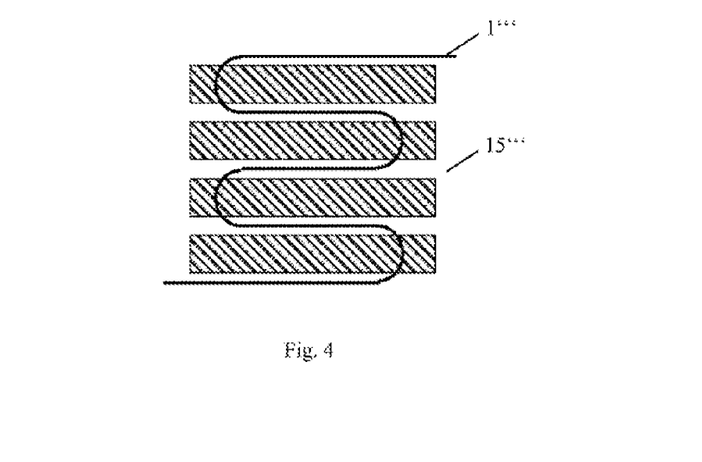
FIG. 4 a schematic top view of a measurement body with a sensor unit arranged thereupon according to an embodiment of the invention.

FIG. 4 shows a schematic top view of a measurement body 15''' with a sensor unit 1''' arranged thereupon according to an embodiment of the invention.

As shown by example in FIG. 4, the flexible design of the substrate enables the recording of various temperature values at various positions on the measurement body 15'''. The measurement body 15''' shown in FIG. 4 may comprise, for example, several layers, for example several galvanic cells, wherein the sensor unit 1''' is guided between these cells.

Figure 5:
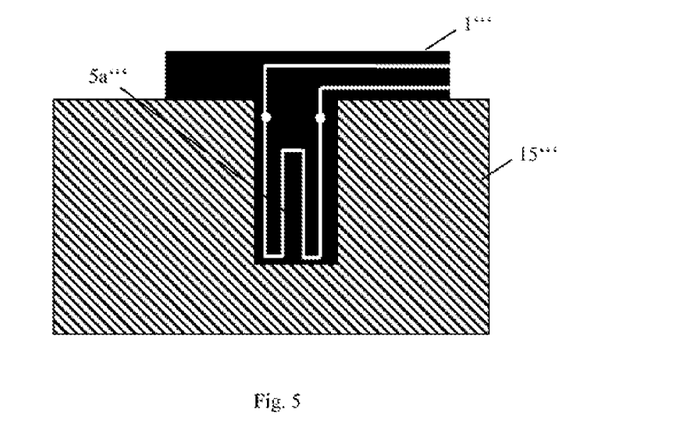
FIG. 5 a schematic side view of a region of the measurement body with a sensor unit arranged thereupon according to the embodiment shown in FIG. 4.

FIG. 5 shows a schematic top view of a region of the measurement body 15''' with a sensor unit 1''' arranged thereupon. The section indicated shows a region of the measurement body 15''' already shown in FIG. 4. As shown in FIG. 5, at least one sensor element 5a''' is arranged between two layers of the measurement body 15'''.

Figure 6:
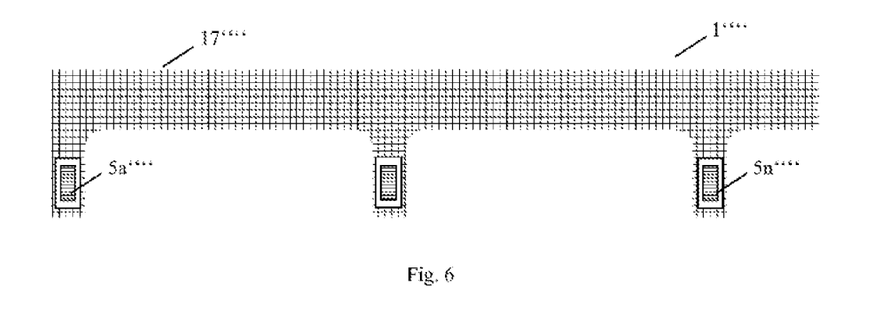
FIG. 6 a schematic view of a second surface of a sensor unit with a single-part leveling film arranged thereupon according to an embodiment of the invention.

FIG. 6 shows a schematic view of a second surface of a sensor unit 1'''' with a single-part leveling film 17'''' arranged thereupon according to an embodiment of the invention.

In the embodiment shown, the leveling film 17'''' is designed as a single part, corresponds substantially to the geometry of the substrate, and covers the regions about the sensor elements 5a''''-5n'''' on the second surface. In the embodiment shown, the sensor elements 5a''''-5n'''' are situated in recesses of the leveling film 17'''', which are shown as white outlines.

Figure 7:
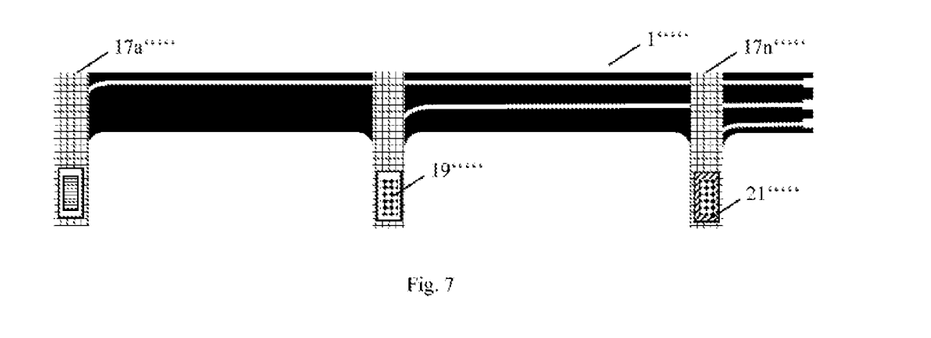
FIG. 7 a schematic view of a second surface of a sensor unit with a multi-part leveling film arranged thereupon according to an embodiment of the invention.

FIG. 7 shows a schematic view of a second surface of a sensor unit 1'''' with a multi-part leveling film 17'''' arranged thereupon according to an embodiment of the invention.

In the embodiment shown, the sections of the leveling film 17a''''-17n'''' cover the traces at least partially and enclose the sensor elements at least partially.

FIG. 7 shows that at least one sensor element may be covered with a cover film 19'''' in order to prevent the penetration of moisture into the contact area of the sensor element. Alternatively or additionally, a casting material 21'''' may be arranged on a sensor element and/or in a region in the recess, as likewise shown in FIG. 7, in order to prevent the penetration of moisture.

Figure 8:
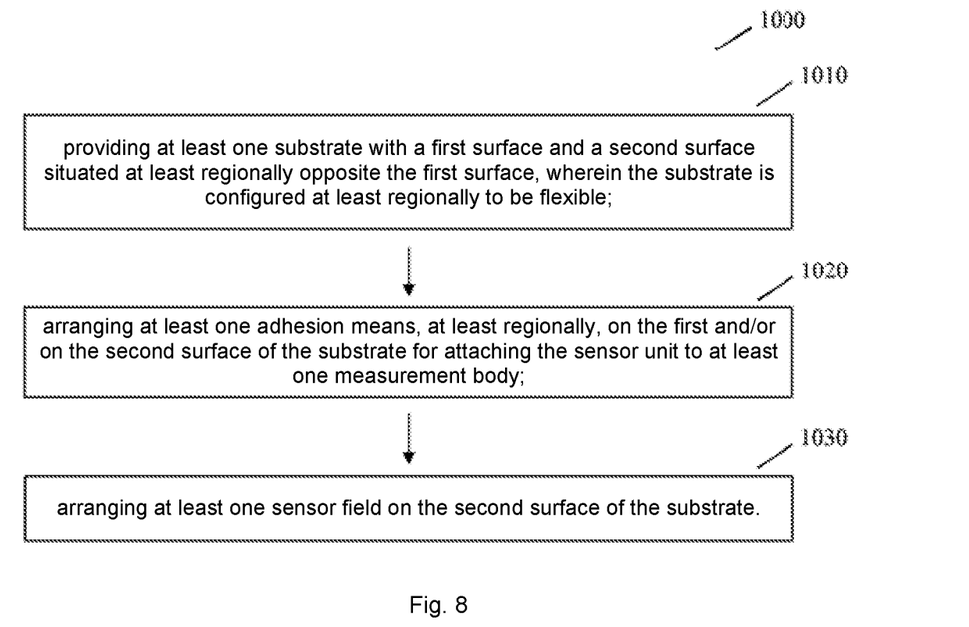
FIG. 8 a method for producing a sensor unit according to an embodiment of the invention.

FIG. 8 shows a method 1000 for producing a sensor unit according to an embodiment of the invention, having the following steps:

provision 1010 of at least one substrate with a first surface and a second surface situated at least regionally opposite the first surface, wherein the substrate is configured at least regionally to be flexible;

arrangement 1020 of at least one adhesion means, at least regionally, on the first and/or on the second surface of the substrate for attaching the sensor unit to at least one measurement body; and arrangement 1030 of at least one sensor field on the second surface of the substrate.

Further features and advantages of the invention result from the following description, in which preferred embodiments of the invention are explained by means of schematic drawings.

LIST OF REFERENCE NUMERALS 1, 1', 1", 1''', 1'''', 1''''' Sensor unit
3, 3" Substrate
5a, 5a', 5a", 5a''', 5a'''', 5n, 5n', 5n'',
5n'''' Sensor element
7a, 7a", 7n, 7n" Trace
8 Insulation layer
9a, 9a', 9n, 9n' Connection pad
11a, 11a" 11b, 11 n" Adhesive film
13a", 13n" Via point
15''' Measurement body
17'''', 17a'''', 17n'''' Leveling film
19'''' Cover film
21'''' Casting material
1000 Method for producing a sensor unit
1010 Provision of a substrate
1020 Arrangement of an adhesion means
1030 Arrangement of a sensor field

The invention claimed is:
1. A sensor unit for detecting a spatial temperature profile, comprising:

at least one substrate with a first surface and a second surface situated at least regionally opposite the first surface, wherein the substrate is configured at least regionally to be flexible;

at least one adhesion means arranged at least regionally on the first surface and/or on the second surface for attaching the sensor unit to at least one measurement body; and at least one sensor field arranged on the second surface of the at least one substrate;

wherein the at least one sensor field comprises at least two sensor elements each comprising a resistance element that are each adapted for recording a temperature, and which are arranged at different positions on the second surface of the at least one substrate; and wherein the at least two sensor elements are formed at least in regions from a common central trace, which is a common ground connection, arranged on the first surface or on the second surface.

2. The sensor unit according to claim 1, wherein at least one sensor element on the second surface has electrical contact by means of at least one trace on the second surface, and/or wherein at least one sensor element on the second surface has electrical contact by means of at least one trace on the first surface, wherein at least one via point through the substrate electrically connects the at least one sensor element on the second surface to the trace on the first surface, wherein the sensor elements are formed, at least regionally, from a common central trace, which is arranged on the first surface and/or on the second surface.

3. The sensor unit according to claim 2, wherein the sensor elements comprise meandering resistance lines made from a conductive platinum, wherein the resistance elements are arranged on the second surface using screen-printing or vapor deposition.

4. The sensor unit according to either claim 2, wherein at least two traces intersect at least regionally, and wherein at least one insulation layer is arranged between the two traces in a region in which the two traces intersect.

5. The sensor unit according to any of claims 2, wherein the traces have at least one connection pad, comprising a silver and/or copper material for establishing contact with the sensor elements.

6. The sensor unit according to claim 1, wherein the at least one substrate comprises a flexible polyimide film.

7. The sensor unit according to claim 1, wherein the at least one adhesion means comprises at least one adhesive film.

8. The sensor unit according to claim 1, comprising:
at least one leveling polymer film formed as a single part or multiple parts; and
a circuit-board material, comprising one of a phenolic laminated sheet and a glass-fiber-reinforced epoxide, arranged on the second surface of the substrate at least regionally.

9. The sensor unit according to claim 8, comprising:
at least one cover film arranged on the second surface of the substrate at least regionally in recess areas of the leveling film and arranged on the sensor field, and/or
at least one casting material comprising a silicone compound, arranged on the second surface of the substrate at least regionally in recess areas of the leveling film and arranged on the sensor field.

10. The sensor unit according to claim 1 used for detecting a spatial temperature profile at different cells of a battery or a fuel cell.

11. A galvanic cell, comprising one of a battery cell and a fuel cell, with at least one sensor unit according to claim 1 arranged on the galvanic cell.

12. A method for producing a sensor unit for detecting a spatial temperature profile, comprising:
providing at least one substrate with a first surface and a second surface situated at least regionally opposite the first surface, wherein the substrate is configured at least regionally to be flexible;
arranging at least one adhesion means, at least regionally, on the first and/or on the second surface of the substrate for attaching the sensor unit to at least one measurement body; and
arranging at least one sensor field on the second surface of the substrate;
wherein the at least one sensor field comprises at least two sensor elements each comprising a resistance element that are each adapted for recording a temperature, and which are arranged at different positions on the second surface of the at least one substrate; and wherein the at least two sensor elements are formed at least in regions from a common central trace, which is a common ground connection, arranged on the first surface or on the second surface.

13. The method according to claim 12, wherein the arranging has at least one sensor field:
arranging the sensor field by means of screen-printing, gravure printing, pad printing, and/or by means of inkjet printing on the basis of an ink comprising metallic particles made of gold, silver, platinum, and/or a silver-palladium alloy; and/or
arranging the sensor field by means of vapor deposition of a metallic layer onto the second surface and/or laser ablation of the metallic layer; and/or
arranging the sensor field by means of an aerosol deposition process through the deposition of aerosols comprising precious metals.

14. The method according to claim 12, wherein the arranging has at least one sensor field:
arranging a plurality of traces, for the electrical contacting of at least one of at least two sensor elements, which are comprised by the sensor field; or
arranging at least one connection pad, on the trace.

* * * * *